No. 894,715. PATENTED JULY 28, 1908.
J. W. ALLEN.
COTTON CHOPPER.
APPLICATION FILED DEC. 31, 1907.
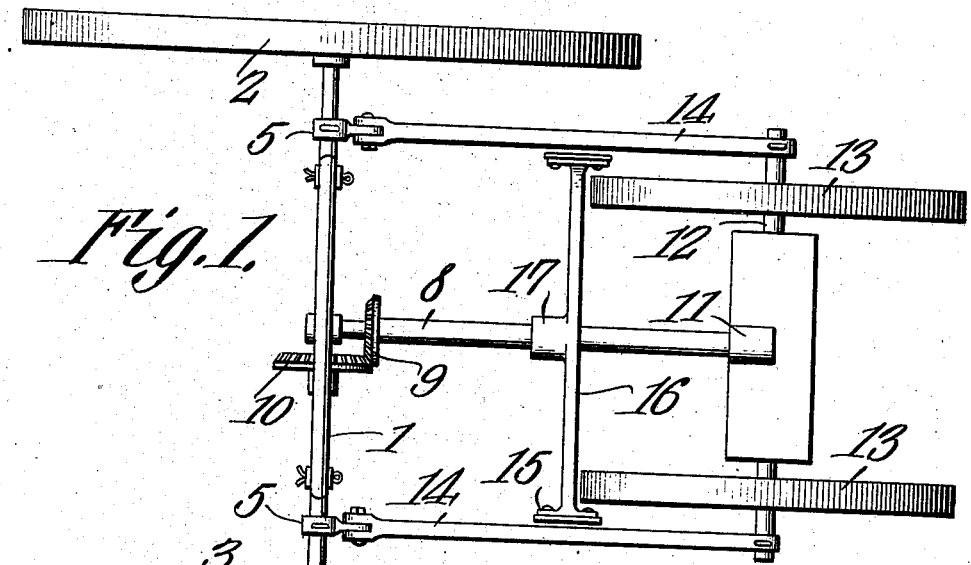
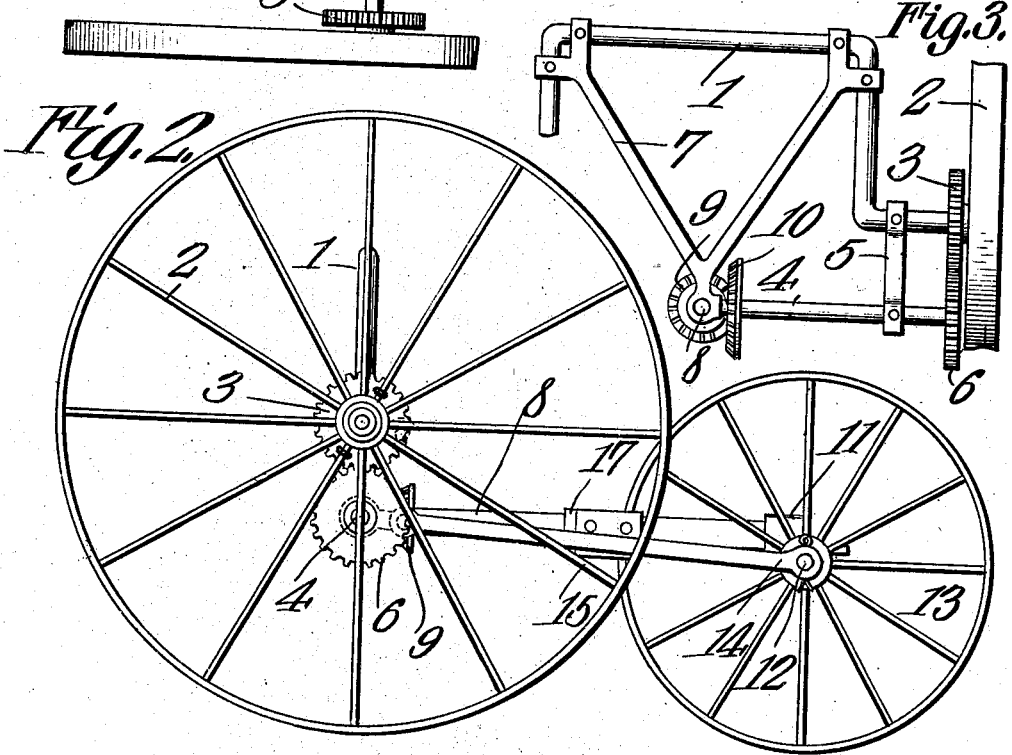
Witnesses
Inventor
John W. Allen
By
Attorneys

UNITED STATES PATENT OFFICE.

JOHN W. ALLEN, OF DUBLIN, TEXAS.

COTTON-CHOPPER.

No. 894,715.  Specification of Letters Patent.  Patented July 28, 1908.

Application filed December 31, 1907. Serial No. 408,730.

*To all whom it may concern:*

Be it known that I, JOHN W. ALLEN, a citizen of the United States, residing at Dublin, in the county of Erath and State of Texas, have invented a new and useful Cotton-Chopper, of which the following is a specification.

This invention has relation to cotton choppers and it consists in the novel construction and arrangement of its parts as hereinafter shown and described.

The object of the invention is to provide a cotton chopper the parts of which are so arranged and have relative movement so that the chopping hoes may effectually operate upon the row of plants as the implement is drawn along even though the surface of the soil in the vicinity of the row be uneven or containing mounds or hollows.

The cotton chopper is in the form of an attachment which may be easily and readily applied to a portion of the frame of a cultivator and consists primarily of a rotating shaft adapted to be actuated through the instrumentality of one of the cultivator wheels and is supported at its rear end upon an axle which in turn is supported by trailing wheels of relatively small diameter and arranged comparatively close together. Chopping hoes are mounted upon said shaft and their staves are longer than the distance between the trailing wheels while the hoe blades mounted upon the staves extend at their rear ends to points within the diameter of the trailing wheels so that the cutting operation may occur at a point nearer the vertical axis of the wheels than the length of the radius of the wheels.

In the accompanying drawing: Figure 1 is a top plan view of the cotton chopper. Fig. 2 is a side elevation of the same, and Fig. 3 is a front elevation of a part of the forward portion of the chopper.

The arch axle 1 is the same as is used upon ordinary straddle row cultivators and is supported by the usual ground wheels 2. The gear wheel 3 is attached to one of the ground wheels 2 and rotates with the same. The shaft 4 is journaled in one of the hangers 5 attached to the axle 1 and is provided with a gear wheel 6 which meshes with the gear wheel 3. The bracket 7 depends from the intermediate arch portion of the axle 1. The shaft 8 is journaled at its forward end in the lower portion of the bracket 7. Said shaft is provided with a beveled pinion 9 which meshes with a beveled pinion 10 mounted upon the shaft 4. The rear end of the shaft 8 is journaled in a bearing 11 which is mounted upon the axle 12. Said axle is supported by the trailing wheels 13 which are comparatively close together and of small diameter. The rear ends of the bars 14 are pivotally connected to the ends of the axle 12 and the forward ends of said bars are pivotally connected with the hangers 5. The hoe blades 15 are mounted on the hoe staves 16 which in turn are attached to the collar 17 mounted upon the shaft 8. The combined length of the alined staves 16 is greater than the distance between the trailing wheels, 13, 13 and the rear ends of the hoe blades 15 are so extended as when in rotation to describe orbits which intersect the orbits described by the trailing wheels 13 when they are rotating.

By this arrangement of the hoe blades they operate at points nearer the vertical axis of the wheels 13 than the distance from the centers of the said wheels to their forward edges, and consequently, as the said trailing wheels enter depressions in the ground or pass over mounds the said hoes have a tendency to cut at a uniform depth below the surface of the soil and the cutting operation of the hoes in this respect is governed more by the trailing wheels 13 than by the wheels 2. By reason of the fact that the rear ends of the bars 14 pivotally connect with the axle 12 the operation of the hoes 15 is the same as that just above described even should one of the wheels 13 enter a depression in the ground while the other wheel 13 is passing over an elevation. By reason of the said pivotal connection between the bars 14 and the axle 12 the said axle 12 is not necessarily held in parallel alinement with the axle 1 but may swing in a plane parallel with the plane occupied by the axle 1.

Having thus described my invention, what I claim as new and desire to secure by Letters Patent is:

A cotton chopper comprising an axle, wheels supporting the same, bars pivotally connected to said axle, an axle pivoted to the rear end of said bars, trailing wheels mounted upon the last said axle and being comparatively close together and of small diameter, a shaft supported at its ends by the axles, means for transmitting movement to said shaft, and hoes mounted upon the said shaft and being further from each other than the distance between the trailing wheels and adapted to describe orbits which intersect the orbits of the trailing wheels.

In testimony that I claim the foregoing as my own, I have hereto affixed my signature in the presence of two witnesses.

JOHN W. ALLEN.

Witnesses:
 W. L. COLE,
 J. P. KENT.